(12) United States Patent
Timtner et al.

(10) Patent No.: US 8,104,751 B2
(45) Date of Patent: Jan. 31, 2012

(54) DEVICE FOR HOLDING A DOUBLE CLUTCH IN A BALANCING MACHINE

(75) Inventors: Karlheinz Timtner, Bad Homburg (DE); Dieter Thelen, Modautal (DE)

(73) Assignees: Schenck RoTec GmbH, Darmstadt (DE); RINGSPANN GmbH, Bad Homburg (DE)

( * ) Notice: Subject to any disclaimer, the term of this patent is extended or adjusted under 35 U.S.C. 154(b) by 949 days.

(21) Appl. No.: 11/732,743

(22) Filed: Apr. 4, 2007

(65) Prior Publication Data

US 2007/0240507 A1 Oct. 18, 2007

(30) Foreign Application Priority Data

Apr. 13, 2006 (DE) .......................... 10 2006 017 877
Nov. 24, 2006 (DE) .......................... 10 2006 055 984

(51) Int. Cl.
*B23Q 3/08* (2006.01)

(52) U.S. Cl. ................................ 269/32; 269/24; 269/95

(58) Field of Classification Search .................... 269/32, 269/24–27, 20, 91–94
See application file for complete search history.

(56) References Cited

U.S. PATENT DOCUMENTS

| 6,698,736 | B2 * | 3/2004 | Dugas et al. | 269/32 |
|---|---|---|---|---|
| 6,902,160 | B1 * | 6/2005 | Zajac et al. | 269/49 |
| 6,913,254 | B2 * | 7/2005 | Pavlik et al. | 269/49 |
| 6,931,980 | B1 * | 8/2005 | Zajac, Jr. et al. | 91/396 |
| 7,017,895 | B2 * | 3/2006 | Sakamoto | 269/32 |
| 2005/0051939 | A1 * | 3/2005 | Beffrieu | 269/32 |
| 2007/0240507 | A1 * | 10/2007 | Timtner et al. | 73/460 |

FOREIGN PATENT DOCUMENTS

| DE | 22 59 190 | 5/1974 |
|---|---|---|
| DE | 10 2004 042 399 | 3/2005 |
| GB | 2 243 455 | 10/1991 |

* cited by examiner

*Primary Examiner* — Lee D Wilson
(74) *Attorney, Agent, or Firm* — Collard & Roe, P.C.

(57) ABSTRACT

A device for holding a constructional unit (40) of a double clutch in a balancing machine, wherein the constructional unit (40) comprises a clutch cage (41) to be balanced, with a pivot bearing (45) and driving disks (46, 47), and contains a bearing mandrel (1), which has a first clamping device (24) for clamping the pivot bearing (45) rotatably bearing the clutch cage (41) to be balanced and a second clamping device (11) for clamping the driving disk (47). One of the clamping devices (11) is adjustable in respect of the bearing mandrel (1) in the axial direction by means of an operating device (22). The bearing mandrel (1) additionally has a third clamping device (29, 57) for clamping the driving disk (46), which is stationary or adjustable in respect of the bearing mandrel (1) in the axial direction by means of an operating device (34).

16 Claims, 4 Drawing Sheets

DEVICE FOR HOLDING A DOUBLE CLUTCH IN A BALANCING MACHINE

CROSS-REFERENCE TO RELATED APPLICATIONS

This application claims the benefit of German Patent Application No. 10 2006 017 877.7, filed on Apr. 13, 2006, and German Patent Application No. 10 2006 055 984.3, filed on Nov. 24, 2006. The disclosure of the above applications is incorporated herein by reference.

FIELD OF THE INVENTION

The invention relates to a device for holding a constructional unit of a double clutch in a balancing machine, the constructional unit comprising a clutch cage to be balanced, with a pivot bearing and at least one driving disk.

BACKGROUND AND SUMMARY

Double clutches are used in so-called double clutch or parallel manual transmissions for motor vehicles. A known embodiment has a clutch cage with several pressure plates, which are connected to one another by the clutch cage. Arranged between the pressure plates are loose driving disks. The clutch cage with the pressure plates forms a structural unit which has to be balanced after assembly. The driving disks arranged between the pressure plates are balanced before being mounted. However, after mounting, the driving disks are likewise located in the clutch cage. So that they do not impair the balancing process, they must be held for balancing of the clutch cage in such a way that they do not touch the pressure plates.

The object of the invention is to create a device for holding a constructional unit of a double clutch in a balancing machine, which allows rotatable bearing of the clutch cage and, at the same time, holds the driving disks arranged in the clutch cage without play in such a way that they do not touch the pressure plates in the clutch cage. The device should also be easy and reliable to handle and quick to operate.

The object is achieved by the invention cited in claim 1. Advantageous configurations of the invention are cited in the subordinate claims.

According to the invention, the device for holding a double clutch in a balancing machine has a bearing mandrel which has a first clamping device for clamping a pivot bearing rotatably bearing the clutch cage to be balanced and a second clamping device for clamping a driving disk of the double clutch, one of the two clamping devices being adjustable in respect of the bearing mandrel in the axial direction by means of an operating device.

With the device according to the invention the clutch cage, via the pivot bearing associated with it, and the driving disk are clamped separately from one another on a bearing mandrel. Then by axial adjustment of a clamping device, the driving disk is brought into a released position made available by the pressure plates of the clutch cage, so there is no longer any contact between the driving disk and the pressure plates of the clutch cage. Depending on which position the driving disks have after clamping and depending on which of the clamping devices is axially adjusted, the axial adjustment must take place in one direction or the other and the device constructed accordingly. The device according to the invention allows sufficiently rigid and exactly positioned bearing of the clutch cage and therefore creates the condition for precise measuring of the imbalance to be balanced out. The driving disk not involved in the imbalance measurement is held securely in a neutral position and cannot therefore impede the measuring process.

The bearing mandrel may have various spatial positions. The longitudinal axis of the bearing mandrel is preferably vertically arranged, only the lower end being fixed. This results in a defined clamping position for the driving disk lying loose between the pressure plates when the double clutch is placed onto the bearing mandrel, as said driving disk rests by its weight on top of the pressure plate located below it. After clamping of the pivot bearing of the clutch cage and the driving disk, the driving disk can then be released from the pressure plate by a defined stroke of the second clamping device directed upwards or a stroke of the first clamping device directed downwards.

In order to be able to balance double clutches with two driving disks, according to a further proposal of the invention, the clamping mandrel may have a third clamping device. This may be stationary or adjustable in respect of the bearing mandrel in the axial direction by means of an operating device.

The bearing mandrel preferably has a fastening end which can be connected to the balancing machine and a free end, its cross-section tapering in several cylindrical steps from the fastening end to the free end and the individual steps carrying a clamping device in each case.

Clamping assemblies with annular clamping disks and means for axial tightening of the clamping disks may be provided as clamping devices according to the invention. They allow precisely centered clamping with short clamping strokes and are distinguished by low constructional complexity and outlay. Other configurations of clamping devices are likewise possible. Actuation of the clamping devices can be done either by hand by means of a spindle-nut arrangement or by pneumatic, hydraulic or electric actuators. The first clamping device, serving to clamp the pivot bearing of the clutch cage, is preferably arranged immediately on a cylindrical stepped face of the bearing mandrel and supported on a shoulder limiting the stepped face. The second or third clamping device, intended for clamping a driving disk, comprises an inner clamping sleeve with a flange extending radially outwards, an outer clamping sleeve held displaceably on the inner clamping sleeve and a clamping assembly, which is arranged between the flange and the outer clamping sleeve and can be moved into the clamping position by the outer clamping sleeve and the flange approaching one another, the inner clamping sleeve being held displaceably on a step of the bearing mandrel and being axially adjustable with the aid of the operating device. A spindle-nut arrangement or a pneumatically, hydraulically or electrically actuatable actuator may be provided as operating device.

According to a further proposal of the invention the clamping device arranged at the free end of the bearing mandrel can be easily removable from the bearing mandrel. This enables more freedom of choice of the clamping diameter and allows the arrangement of an actuator for actuating the clamping device, the diameter of which is greater than the clamping diameter.

BRIEF DESCRIPTION OF THE DRAWINGS

The invention is explained below in greater detail using embodiments illustrated in the drawings, wherein.

DETAILED DESCRIPTION

Figure 1:
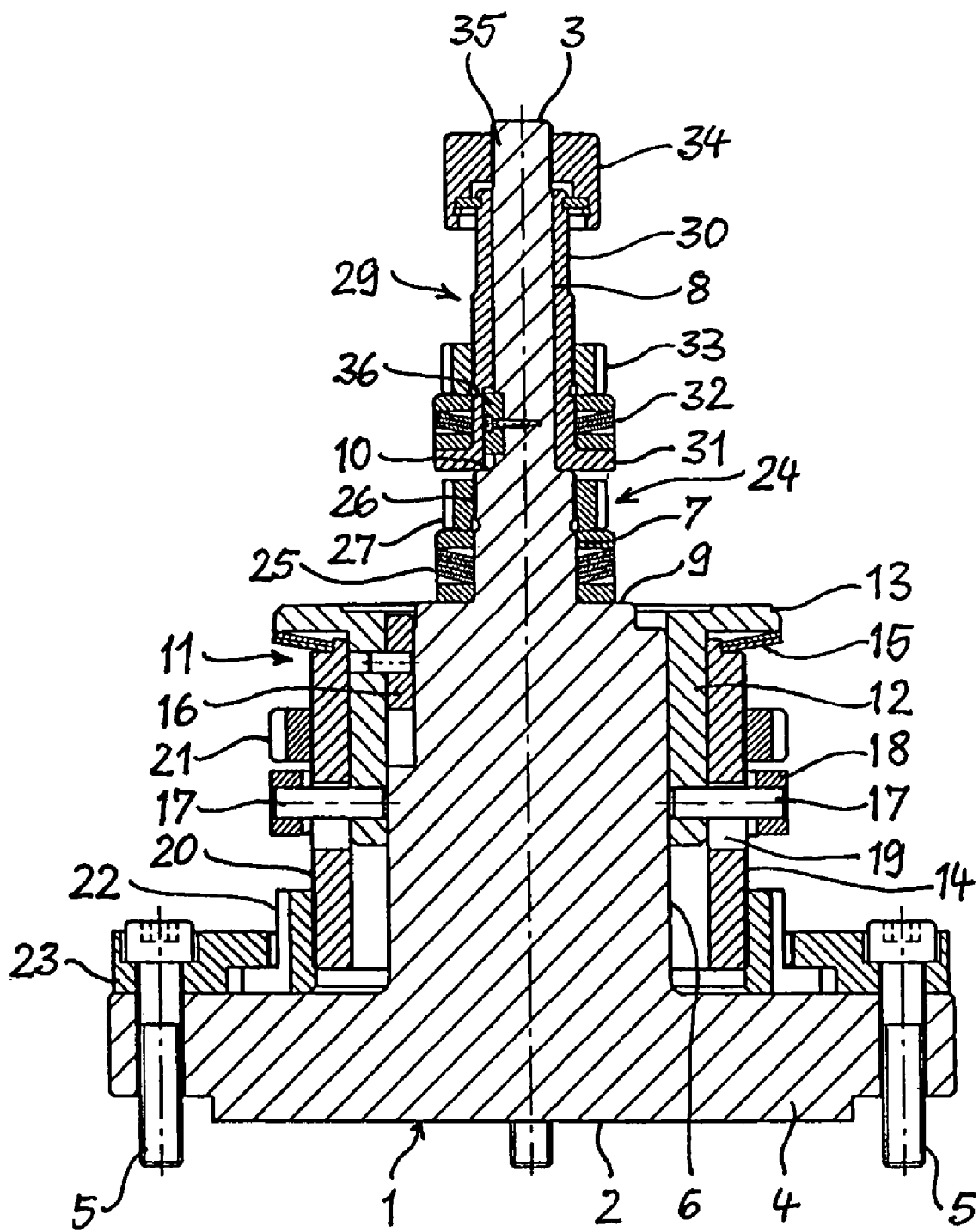
FIG. 1 shows a longitudinal portion of a device according to the invention to be actuated by hand.

The device shown in FIG. 1 has a vertically arranged bearing mandrel 1 with a lower fastening end 2 and an upper free end 3. The fastening end 2 is constructed as a plate-shaped flange 4, which can be fastened to a carrier part of a balancing machine by screws 5. The bearing mandrel 1 has three coaxial, cylindrical steps 6, 7, 8, the outer diameter of which decreases as they move away from the flange 4. Between step 6 and step 7 is a radial shoulder 9 and between step 7 and step 8 a radial shoulder 10.

Arranged on step 6 is a clamping device 11, comprising an inner sleeve 12 with a flange 13, an outer sleeve 14 and a clamping assembly 15 made of annular clamping disks. The clamping disks are supported in the axial direction on the flange 13 on one side and on the outer sleeve 14 on the other side. The inner sleeve 12 is rigidly connected by a pin to an adjustment spring 16 which is arranged in a longitudinal groove in step 6 and prevents rotation of the inner sleeve 12 in respect of the bearing mandrel 1. The inner sleeve 12 is additionally connected by radial pins 17 to a ring 18 surrounding the outer sleeve 14. The pins 17 extend through elongated holes 19 in the outer sleeve 14 and thereby form a non-rotatable, but longitudinally movable support for the outer sleeve 14. The end of the outer sleeve 14 opposite the flange 13 is provided with a ring step and forms a bearing for the radial inner edge of the clamping disks of the clamping assembly 15.

The outer casing of the outer sleeve 14 is provided with an outer thread 20. A clamping nut 21, arranged between the clamping assembly 15 and the ring 18, engages in the outer thread 20. Screwed onto the end of the outer sleeve 14 facing away from the clamping assembly 15 is a ring nut 22, which has a ring flange resting against the flange 4. The ring nut 22 is held in contact with the flange 4 by a supporting ring 23 overlapping the ring flange and connectable to the flange 4.

The central step 7 carries a clamping device 24 with a clamping assembly 25, consisting of two rings and several clamping disks arranged between the rings. A portion 26 of step 7 is provided with an outer thread and carries a clamping nut 27, by which the clamping assembly 25 supported on the shoulder 9 can be pressed together to clamp a component.

A further clamping device 29 comprising a sleeve 30 with a flange 31, a clamping assembly 32 and a clamping nut 33 is arranged on step 6. The clamping nut 33 is screwed onto a portion of the sleeve 30 provided with an outer thread and serves to clamp the clamping assembly 32 resting against the flange 31 by pressing together. Like clamping assembly 25, clamping assembly 32 also consists of two rings and annular clamping disks arranged in between. The end of the sleeve 30 opposite the flange 31 is connected rotatably and axially stationary to an adjusting nut 34. The adjusting nut 34 is screwed onto an end portion 35 of step 8 provided with an outer thread. The axial position of the sleeve 30 can be changed in the axial direction by rotating the adjusting nut 34.

Figure 2:
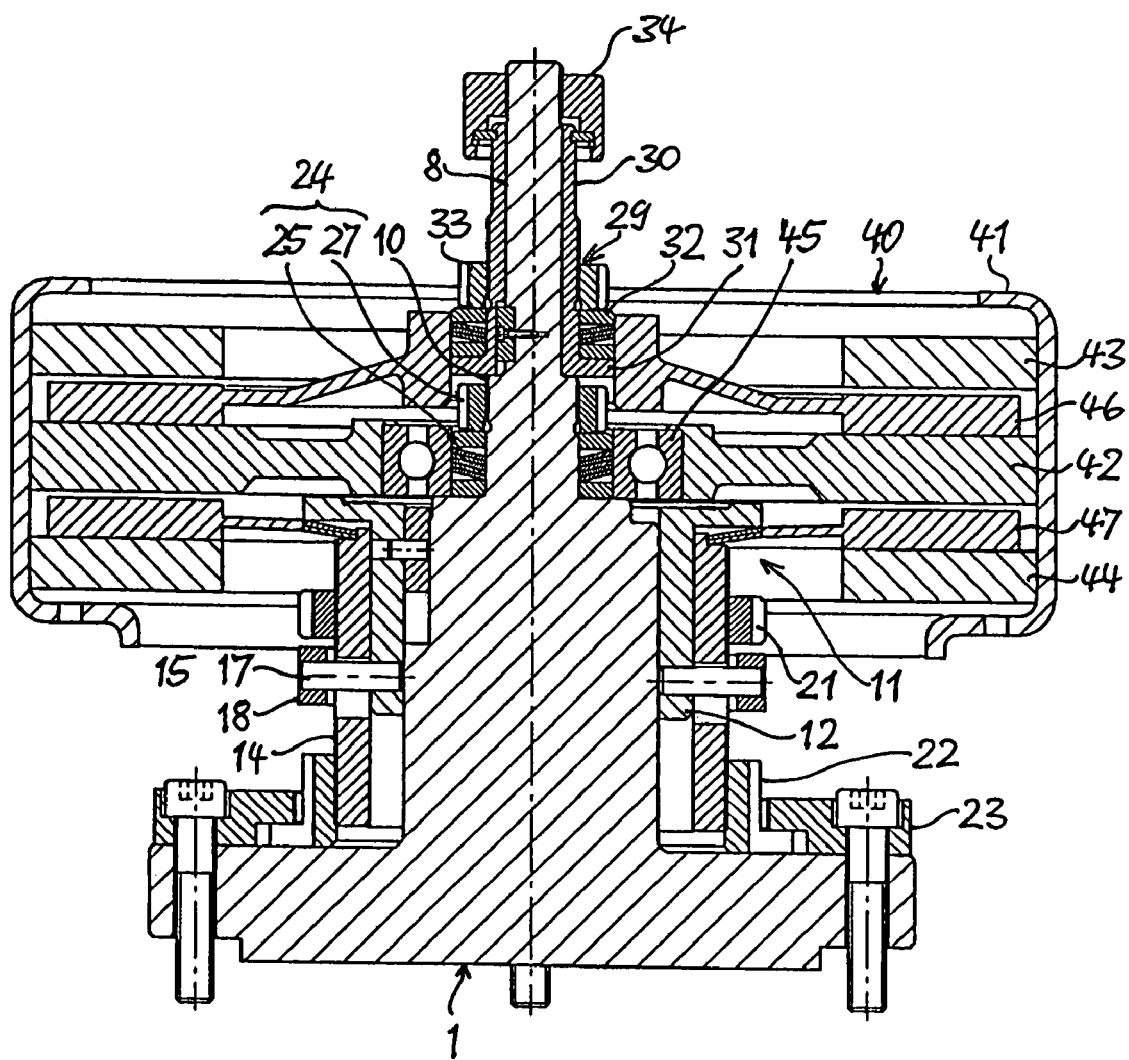
FIG. 2 shows the device according to FIG. 1 with a double clutch arranged thereon.

FIG. 2 shows the device according to FIG. 1 with a constructional unit 40 of a double clutch which is to be balanced arranged thereon. The constructional unit 40 consists of a clutch cage 41 with a central pressure plate 42 and two lateral pressure plates 43, 44. The central pressure plate 42 acts as bearing of the clutch cage 41 and has a roller bearing 45 in its bore. A driving disk 46 or 47 is arranged in each case between the central pressure plate 42 and the lateral pressure plates 43 or 44.

FIG. 2 shows the device with the constructional unit 40 in an intermediate mounting position, which has already been preceded by two mounting steps. At the start of mounting, the constructional unit 40 is placed on the device, the clamping device 29 being removed from step 8 of the bearing mandrel 1. This enables the constructional unit 40 to be placed on even if the diameter of the roller bearing 45 is smaller than the diameter of the hub bore of the driving disk 46. Moreover, removal of the clamping device 29 is required, so that the clamping nut 27 is accessible through the hub bore of the driving disk 46 and can be tightened by a clamping tool, in order to clamp the roller bearing 45 with the aid of the clamping assembly 25. Only when this has been done is the clamping device 29 placed on the bearing mandrel 1 and, by screwing down the adjusting nut 34, brought into the position shown in FIG. 2, in which the flange 31 rests against the shoulder 10.

As further shown by FIG. 2, the driving disks 46, 47 rest by their weight on the pressure plates 42, 44, located below them in each case, their hub bores being located in each case in the clamping range of the clamping devices 29 or 11. In the next steps, the driving disks 46, 47 are clamped and positioned in succession.

To clamp the upper driving disk 46, the clamping assembly 32 is brought into the clamping position by rotating the clamping nut 33 and the driving disk 46 is thereby firmly clamped to the sleeve 30. The sleeve 30 is then removed from the shoulder 10 by a few tenths of a millimeter by approximately half a revolution of the adjusting nut 34 in the release direction and the driving disk 46 is thereby lifted from the central pressure plate 42 by the corresponding amount.

The lower driving disk 47 is clamped by rotating the clamping nut 21 in a direction in which the clamping nut 21 is moved downwards on the outer sleeve 14. The clamping force of the clamping nut 21 is in this case transmitted to the inner sleeve 12 by the ring 18 and the pins 17 and the clamping assembly is pressed together between the two sleeves 12, 14. After driving disk 47 has been clamped, the clamping device 11 is moved upwards by a few tenths of a millimeter by rotating the ring nut 22, so driving disk 47 is lifted from the lateral pressure plate 44 by this amount. The displacement path of the two clamping devices 11 and 29 is dimensioned in each case in such a way that the distance between the driving disks 46, 47 in the end position of all the pressure plates is sufficiently large that the driving disks no longer touch the pressure plates.

Once the described clamping position has been reached, the clutch cage 41 with the pressure plates arranged therein can rotate freely about the roller bearing 45. An imbalance measurement can therefore be carried out without impairment by the driving disks. The drive of the clutch cage 41 during the imbalance measurement can take place in the normal way, for example by means of a belt wrapped round the clutch cage.

After the balancing, clamping device 11 is moved back into its original position and released. Clamping device 29 is likewise released and removed from the bearing mandrel 1. Finally, clamping device 24 is released and the constructional unit is removed from the device.

Figure 3:
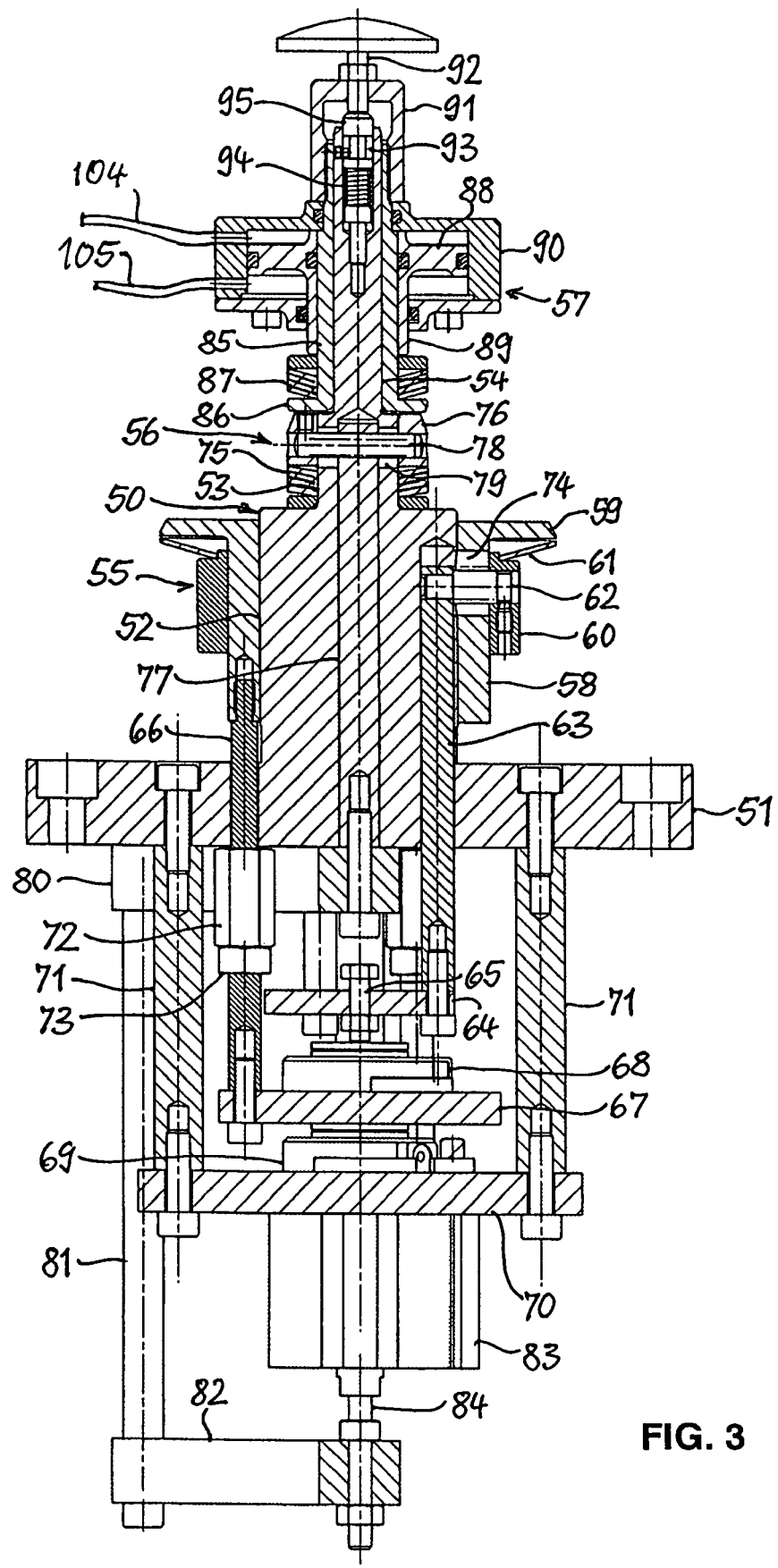
FIG. 3 shows a device according to the invention which can be automatically clamped with the aid of pneumatic actuators.

FIG. 3 shows an embodiment of a device according to the invention in which pneumatic actuators are provided for carrying out the clamping and adjusting steps, so holding and clamping a double clutch constructional unit can be carried out largely automatically. As with the preceding embodiment, the device has a three-step bearing mandrel 50 with a flange 51, which serves to fasten the device in a balancing machine. Each step 52, 53, 54 of the bearing mandrel 50 carries a clamping device 55, 56, 57.

The clamping device 55 adjacent to flange 51 consists of an inner sleeve 58, which has a flange 59 extending radially outwards on one end. Arranged axially displaceably on the sleeve 58 is an outer sleeve 60. The end of sleeve 60 facing flange 59 is constructed with a step for bearing the inner edge of a clamping disk 61 arranged between the sleeve 60 and the flange 59. Instead of clamping disk 61, several clamping disks may be provided. Fastened to the outer sleeve 60 at a peripheral distance are several cogs 62, which extend radially inwards through openings 74 in the sleeve 58. The radially inner ends of the cogs 62 are connected to rams 63 which are parallel to the longitudinal axis of the bearing mandrel 50 and arranged as movable longitudinally in bores of the bearing mandrel 50. The rams 63 project out of the flange 51 on its underside and are there connected, by screws for example, to a yoke plate 64 parallel to the flange 51. Arranged in the centre of the yoke plate 64 is a set screw 65, penetrating the latter and secured by locknuts, which serves to set the clamping stroke.

Fastened to the end face of the inner sleeve 58 opposite the flange 59 at a peripheral distance are several axially parallel threaded rods 66, which penetrate bores in the flange 51 and project downwards beyond the yoke plate 64. The ends of the threaded rods 66 are screwed to a plate 67. The plate 67 carries on the side facing the yoke plate 64 a pneumatic actuating cylinder 168, the piston of which acts on the set screw 65. The underside of the plate 67 facing away from the actuating cylinder 68 rests against the piston of a further pneumatic actuating cylinder 69, which is held by a yoke plate 70. Yoke plate 70 is fastened to the flange 51 by means of rods 71. Arranged on the threaded rods 66 are stop nuts 72, which cooperate with the underside of the flange 51 and limit a movement of the threaded rods 66 directed upwards. The setting of the stop nuts 72 is secured by locknuts 73.

Clamping device 56 arranged on step 53 has a clamping assembly 75, which can be clamped with the aid of a clamping ring 76. To actuate the clamping ring 76, a connecting rod 77 is arranged in a central bore of the bearing mandrel 50 and connected to the clamping ring 76 by a pin 78. The pin 78 penetrates a central cross-bore of the connecting rod 77 and with both its ends engages in corresponding cross-bores in the clamping ring 76. A cross-bore of larger diameter penetrating step 53 takes care of the required freedom of movement of the pin 78 in the axial direction. The connecting rod 77 is fastened by means of a screw to a yoke bar 80 arranged on the underside of the flange 51 and connected via rods 81 to a second yoke bar 82 arranged underneath the yoke plate 70. Arranged on the underside of the yoke plate 70 is a pneumatic actuating cylinder 83, the piston of which acts on a ram 84 fastened centrally to yoke bar 82. If the actuating cylinder 83 is charged with pressure, the piston force, directed downwards, is transmitted via the yoke bars 82, 80, connected to one another, to the connecting rod 77 and from this via the pin 78 to the clamping ring 76 and the clamping assembly 75 is moved into its clamping position. The spring force of the clamping disks of the clamping assembly 75 generally suffices to release the clamping assembly 75 when the actuating cylinder 83 has been relieved of pressure. If this is not the case, additional resetting devices may be provided.

Clamping device 57 has a central sleeve 85, which is placed removably onto step 54 of the bearing mandrel 50. The lower end of the sleeve 85 facing the stepped shoulder is provided with a flange 86 which forms an abutment for a clamping assembly 87 arranged on the sleeve 85. Held above the clamping assembly 87 on the sleeve 85 and sealed against the sleeve 85 by a sealing ring is a ring piston 88 with a sleeve-shaped piston rod 89. The ring piston 88 is surrounded by a cylindrical housing 90, which is sealed on one side against the piston rod 89 and on the opposite side against the sleeve 85. The interior of the cylindrical housing 90 is subdivided by the ring piston 88 into two chambers separated from one another. The cylindrical housing 90 is fixed on the sleeve 85 by a cap 91 screwed onto the upper end of the sleeve 85. A set screw 92 is arranged in the bottom of the cap 91.

The end portion of step 54 has a bore 93 open upwards. Located in the bore 93 is a pressure spring 94 and a ram 95 charged by the pressure spring, the head of which projects out of the bore 93. The pressure spring 94 is slightly biased and presses a ring shoulder of the ram 95 against a stop screw projecting radially into the bore 93. If the ram 95 is pressed from outside, it can be moved deeper into the bore 93 against the force of the pressure spring 94.

As in the embodiment illustrated in FIGS. 1 and 2, before a double clutch constructional unit is placed on, the clamping device 57 must be removed from the bearing mandrel 50. To make this easily possible, the chambers of the cylindrical housing 90 are connected to a pressure control device by flexible pipes 104, 105. After the constructional unit 40 has been placed on and the associated roller bearing has been clamped with the aid of the clamping device 56 via the actuating cylinder 83, to clamp a driving disk with the aid of the clamping device 55, the actuating cylinder 68 is charged with pressure. The piston force directed upwards and the power of recoil directed in the opposite direction are transmitted to the sleeves 60, 58 and cause pressing together of the clamping disk 61, so a driving disk arranged on the clamping disk 61 can be clamped. If, after this, the actuating cylinder 69 is also charged with pressure, this causes a slight movement of the plate 67, and therefore also of the clamped clamping device 55, upwards by a small amount, until the stop nuts 72 come into contact with the underside of the flange 51. This causes the clamped driving disk to be lifted from the pressure plate located beneath. The size of the desired stroke can be set by twisting the stop nuts 72 on the threaded rods 66 to the appropriate measurement.

If the actuating cylinders 68, 69 are relieved of pressure, the components return to their initial positions under the effect of the clamping disk 61, their weight and possibly additional readjusting springs.

After that, the clamping device 57 is placed onto step 54 and with the flange 86 is pressed against the shoulder formed by step 53 by a force acting from outside on the set screw 92 or the cylindrical housing 90. The set screw 92 is set in such a way that the ram 95 is pressed into the bore 93 by the amount required to lift a driving disk with pressing together of the pressure spring 94. In this position of the clamping device 57 maintained by the external force, the actuating cylinder 83 is triggered and the ring piston 88 is charged with pressure via pipe 104. This causes the ring piston 88 to move downwards and press the clamping assembly 87 into the clamping position with its piston rod 89. After the driving disk has been clamped, the clamping device 57 is relieved of pressure by the external force. The result of this is that the pressure spring 94 moves the clamping device 57 together with the driving disk clamped by it upwards via the ram 95 by the amount by which the ram 95 had previously been pressed downwards. This effects the required lifting of the upper driving disk clamped by the clamping device 57 by simple means. Furthermore, the size of the amount of lift can be adapted to the respective requirements by adjusting the set screw 92.

Figure 4:
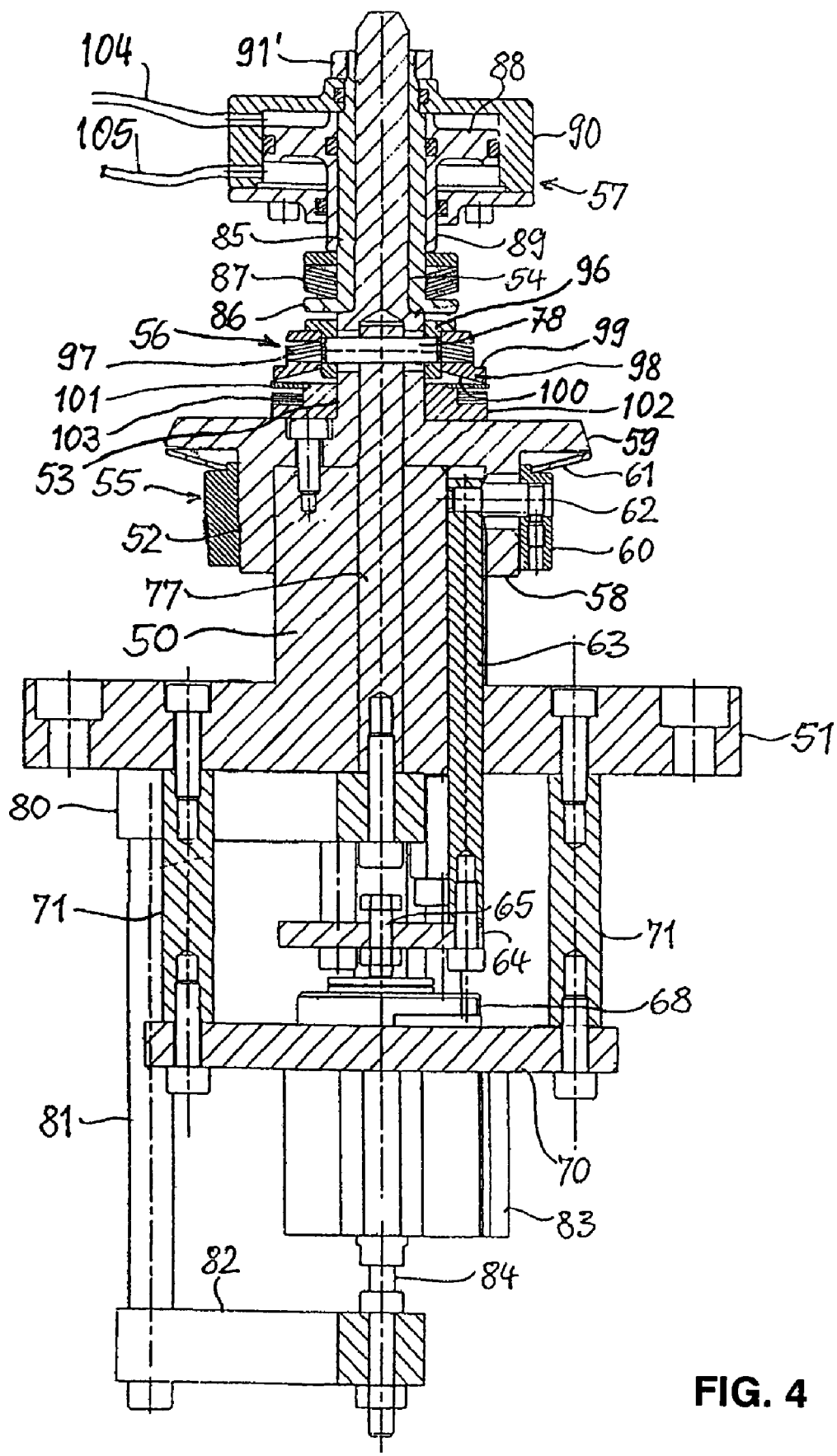
FIG. 4 shows a modification of the device according to FIG. 3.

FIG. 4 shows a further automatically clampable embodiment of a device according to the invention, which is partially constructed similarly to the device according to FIG. 3. The same reference numerals are therefore used below for parts of the two embodiments corresponding to one another. The device according to FIG. 4 differs from the device according to FIG. 3 essentially in that the clamping devices 55, 57 associated with the driving disks of the double clutch constructional unit cannot be axially adjusted in respect of the bearing mandrel 50, but are fixed in respect of the bearing mandrel 50, and instead the clamping device 56 serving to clamp the roller bearing of the clutch cage is axially adjustable in respect of the bearing mandrel 50, in order to be able to set the required play between the driving disks and the pressure plates of the clutch cage.

In the concept according to FIG. 4, the inner sleeve 58 and the flange 59 of the clamping device 55 are rigidly connected to the bearing mandrel 50. Furthermore, the actuating cylinder 68 is fastened to the yoke plate 71 connected to the flange 51. The front actuating cylinder 69, the plate 67 and the threaded rods 66 with stop nuts 72 and lock nuts 73 of the embodiment according to FIG. 3 have been omitted. Differing from FIG. 3, on clamping device 57 the cap 91 with the set screw 92 has been replaced by a single nut 91' and the bore 93, the pressure spring 94 arranged therein and the ram 95 have been omitted.

In order to achieve the adjustability of the clamping device 56, arranged as axially displaceable on step 53 is a sleeve 96, which is rigidly connected to the connecting rod 77 by the pin 78. The sleeve 96 carries a clamping assembly 97, which is supported on a ring collar of the sleeve 96 in the direction of the clamping device 57. On the side of the clamping assembly 97 facing the flange 59 is an intermediate disk 98 which has a larger diameter than the clamping assembly 97 and has a front contact face 99 for the roller bearing to be clamped by the clamping assembly 97. On the side facing away from the clamping assembly 97, the intermediate disk 98 has a conical recess 100. The radially outer edge of the recess 100 rests against the outer edge region of an annular spring washer 101, which is held and supported by its inner edge on a ring 102. The ring 102 is held on step 53 and rests against the end face of the flange 59. On the side of the spring washer 101 facing away from the intermediate disk 98, the ring 102 has a recess in which annular supplementary disks 103 are arranged. In the unclamped state of the spring washers 101, a space is provided between these and the supplementary disks 103.

To accommodate and clamp a double clutch constructional unit, in the device shown in FIG. 4 firstly the clamping device 57 is removed from step 54 of the bearing mandrel 50. The double clutch constructional unit is then pushed onto the device until the roller bearing rests with its end face against the contact face 99 of the intermediate disk 89. The clamping device 57 is then placed on step 54 again and brought with the flange 86 into contact with the end face of step 53 adjoining step 54. Now both clamping devices 55 and 57 can be actuated simultaneously or shortly after one another by triggering their actuating cylinders 68, 90, so clamping disk 61 and the clamping disks of the clamping assembly 87 clamp the driving disks located in their area of action in their bores in each case.

To clamp the roller bearing, the connecting rod 77 is moved downwards by the triggered actuating cylinder 83, the clamping assembly 97 clamping the roller bearing in its bore. On further increase of the actuating force generated by the actuating cylinder 83 and transmitted by the connecting rod 77, the spring washer 101 deforms similarly to a Belleville spring washer, until it comes to rest against the supplementary disks 103 with its outer edge. During this process the clamping device 56 moves downwards with the clutch cage held by it and the pressure plates arranged therein. The driving disks which were previously in contact with the upper sides of the pressure plates cannot follow this movement, as they are held by the fixed clamping devices 55, 57. The movement of the pressure plates therefore creates a gap between the pressure plates and the driving disks, so the driving disks no longer touch the pressure plates. However, this gap must not be dimensioned as too large, so that the gap existing between the upper sides of the driving disks and the undersides of the pressure plates is not too small. The possible axial movement of the clamping device 56 must therefore be correspondingly coordinated. This is done with the aid of the supplementary disks 103 which limit the maximum deformability of the spring washer 101 and therefore also the axial movement of the clamping device 56. It is further important for perfect functioning of the clamping device 56 that the spring stiffnesses of the clamping assembly 97 and the spring washer 101 are carefully coordinated with one another, so that the roller bearing is clamped before the clamping device 56 is moved.

Once the double clutch constructional unit has been clamped, the balancing process can take place. Balancing is followed by removal of the double clutch constructional unit in reverse order.

The device according to FIG. 4 is simpler and more economical than the device according to FIG. 3, because an actuating cylinder and the device for adjusting the upper clamping device 57 have been omitted and the number of parts is correspondingly smaller. Furthermore, the space requirement of the device in the axial direction is less both above and below the flange 51.

What is claimed is:

1. A device for bearing a constructional unit of a double clutch in a balancing machine, the device comprising:
    (a) a bearing mandrel comprising a top portion with an adjustable nut;
    (b) a first clamping device having a sleeve and a flange attached to the bearing mandrel;
    (c) a second clamping device with at least one ring attached to the bearing mandrel beside said first clamping device and separately operable from the first clamping device;
    (d) a first operating device attached to the bearing mandrel;
    wherein, while the first clamping device and the second clamping device are each clamping a respective object, one of the first clamping device and the second clamping device is adjustable along the bearing mandrel in an axial direction via the first operating device.

2. The device according to claim 1, wherein a longitudinal axis of the bearing mandrel is arranged vertically.

3. The device according to claim 1, further comprising a third clamping device attached to the bearing mandrel.

4. The device according to claim 3, further comprising a second operating device;
    wherein the third clamping device is adjustable along the bearing mandrel in the axial direction via the second operating device.

5. The device according to claim 3,
    wherein the bearing mandrel has a free end; and
    wherein the third clamping device is arranged on the free end of the bearing mandrel and is removable from the bearing mandrel.

6. The device according to claim 1, wherein the bearing mandrel has a fastening end connectable to the balancing machine, a free end and a cross-section tapering in several cylindrical steps from the fastening end to the free end;

wherein the individual cylindrical steps of the several cylindrical steps carry clamping devices, respectively; and wherein the clamping devices include the first clamping device and the second clamping device.

7. The device according to claim 1, wherein at least one of the first and second clamping devices comprises a spindle-nut arrangement.

8. The device according to claim 1, wherein at least one of the first and second clamping devices comprises at least one actuator selected from the group consisting of a pneumatic actuator, a hydraulic actuator, and an electric actuator.

9. The device according to claim 1, further comprising a spring element on the bearing mandrel and further comprising a stop on the bearing mandrel;

wherein the first or second clamping device adjustable along the bearing mandrel is supported on the spring element, the spring element counteracting axial actuating force; and wherein a spring path of the spring element is limited by the stop.

10. The device according to claim 9, wherein a position of the stop can be set.

11. The device according to claim 1, wherein the first and second clamping devices respectively comprise clamping assemblies with annular clamping disks and means for axially tightening the clamping disks.

12. The device according to claim 1, wherein the bearing mandrel comprises a cylindrical step and a shoulder limiting the cylindrical step;

wherein the first clamping device is supported on the cylindrical step and the shoulder.

13. The device according to claim 1, wherein the bearing mandrel comprises a step; and wherein the first or second clamping device adjustable along the bearing mandrel comprises a cylindrical sleeve with a flange extending radially outwards and a clamping assembly surrounding the sleeve, the clamping assembly being supported on the cylindrical sleeve and on the flange, the cylindrical sleeve being held displaceably on the step of the bearing mandrel and being axially adjustable along the bearing mandrel via the first operating device.

14. The device according to claim 1, wherein the first or second clamping device adjustable along the bearing mandrel comprises an inner sleeve with a flange, an outer sleeve held displaceably on the inner sleeve, and a clamping assembly arranged between the flange and the outer sleeve, the clamping assembly being movable into a clamping position by the outer sleeve approaching the flange.

15. The device according to claim 14, wherein the first or second clamping device adjustable along the bearing mandrel further comprises a clamping nut;

wherein at least one of the inner and outer sleeves is supported non-rotatably on the bearing mandrel; and wherein the inner sleeve or the outer sleeve has a portion provided with an outer thread; and wherein the clamping nut is arranged on the portion provided with an outer thread.

16. The device according to claim 1, wherein the bearing mandrel has a free end; and wherein the first clamping device or the second clamping device is arranged on the free end of the bearing mandrel and is removable from the bearing mandrel.

* * * * *

UNITED STATES PATENT AND TRADEMARK OFFICE
CERTIFICATE OF CORRECTION

| | | |
|---|---|---|
| PATENT NO. | : 8,104,751 B2 | Page 1 of 1 |
| APPLICATION NO. | : 11/732743 | |
| DATED | : January 31, 2012 | |
| INVENTOR(S) | : Timtner et al. | |

It is certified that error appears in the above-identified patent and that said Letters Patent is hereby corrected as shown below:

In particular, on the cover page, Item [73] please change "Schenck RoTec Gmbh" to correctly read:
--Schenck RoTec GmbH--.

Signed and Sealed this
Seventeenth Day of April, 2012

David J. Kappos
*Director of the United States Patent and Trademark Office*